Dec. 11, 1962   R. E. PLATT II   3,067,521
VERNIER GAUGING DEVICE
Filed Jan. 23, 1961   3 Sheets-Sheet 1
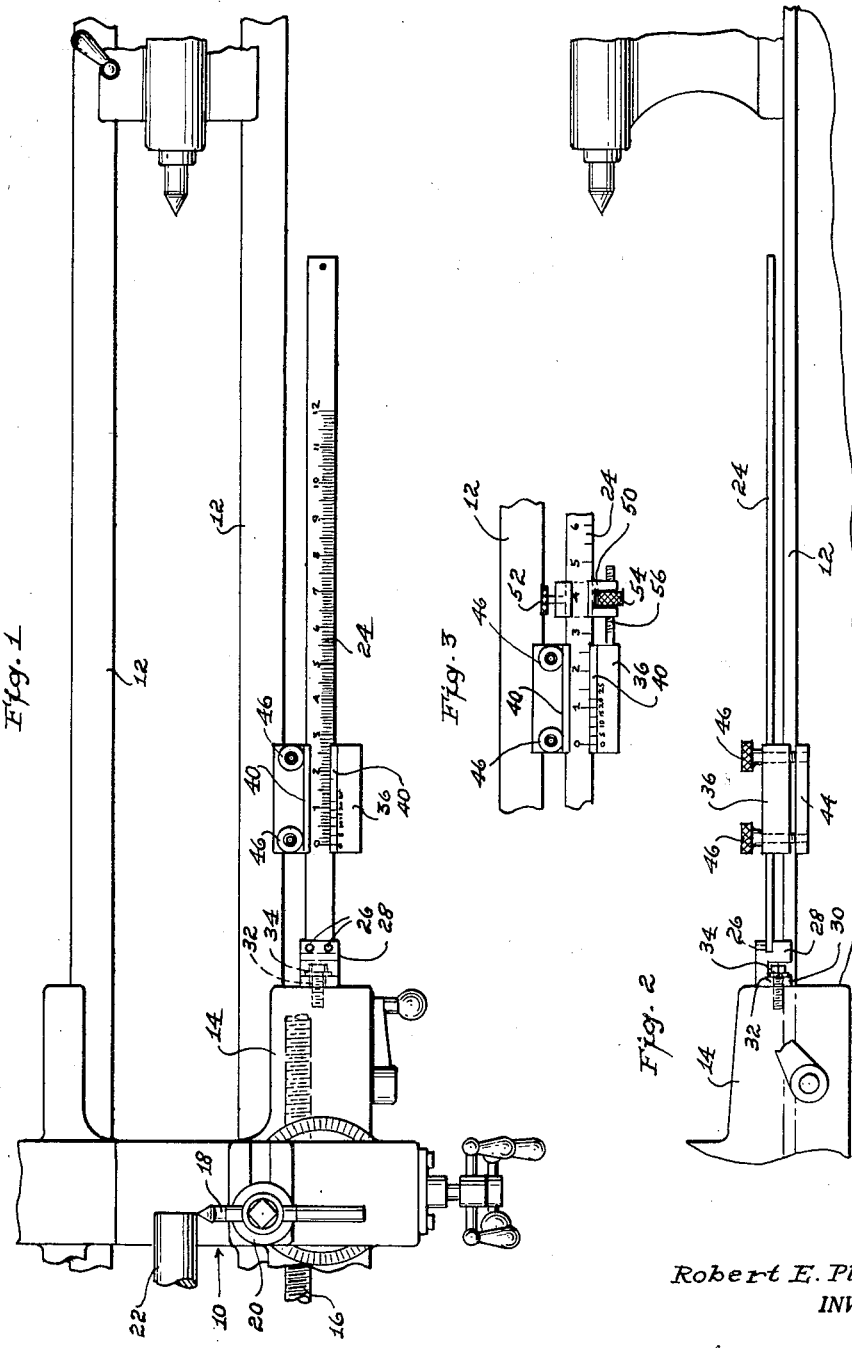
Robert E. Platt II
INVENTOR.
BY
ATTORNEY

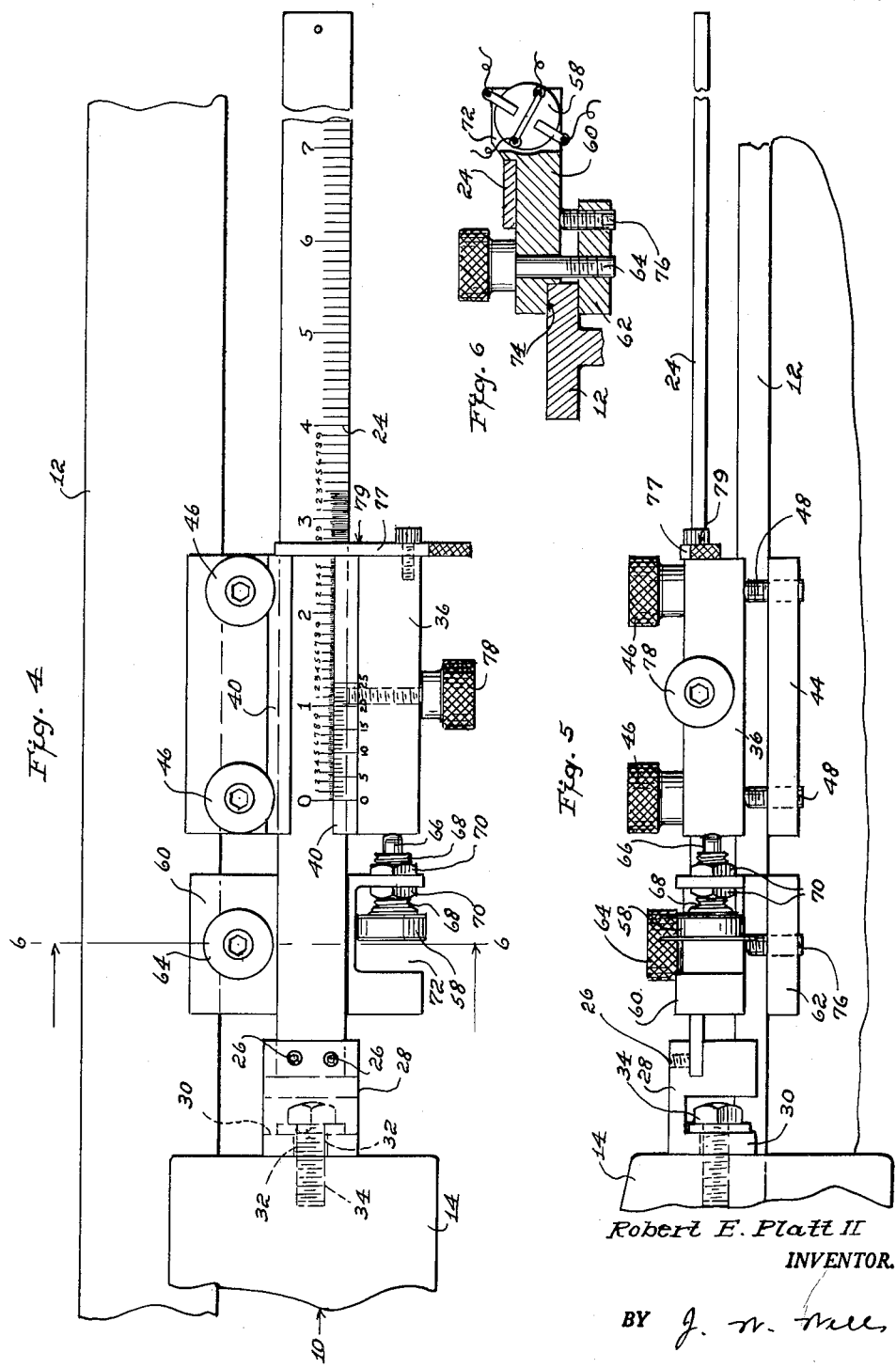

Dec. 11, 1962    R. E. PLATT II    3,067,521
VERNIER GAUGING DEVICE
Filed Jan. 23, 1961    3 Sheets-Sheet 3
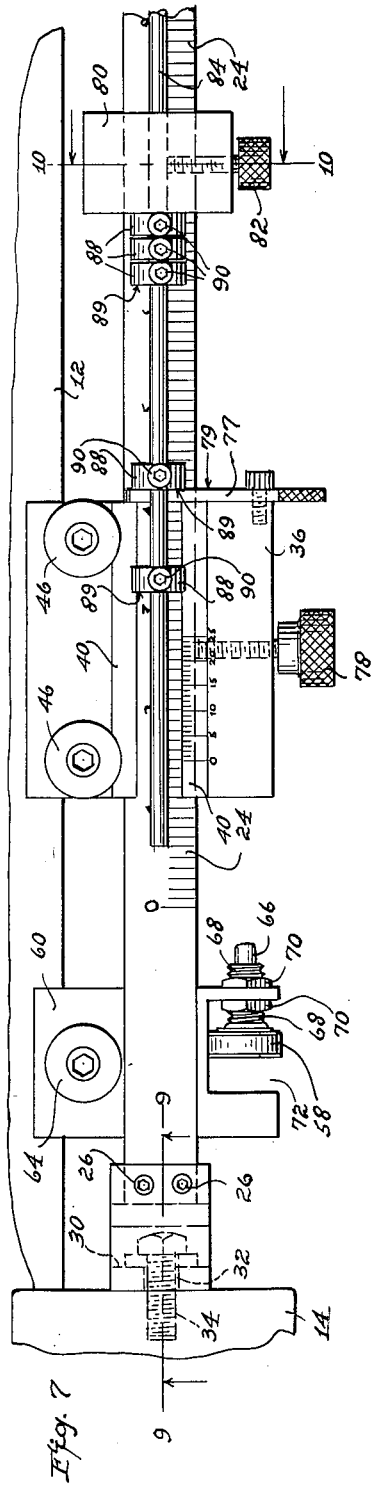
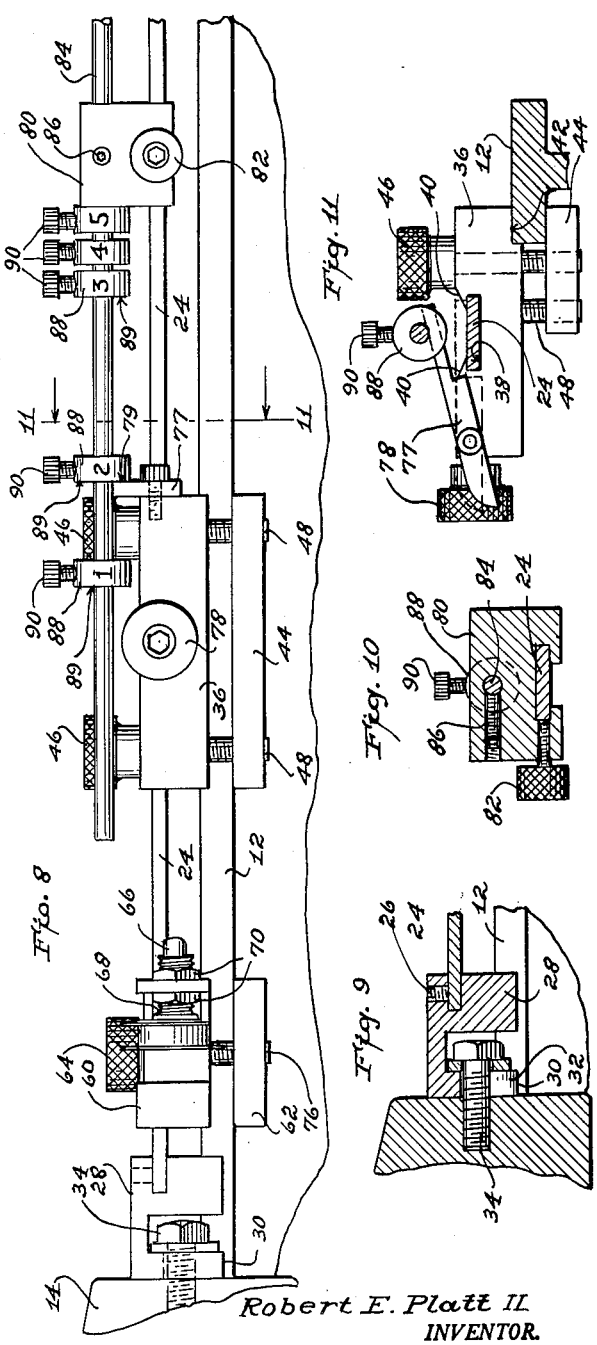
Robert E. Platt II
INVENTOR.
BY J. W. Nalls
ATTORNEY United States Patent Office 3,067,521
Patented Dec. 11, 1962

3,067,521
VERNIER GAUGING DEVICE
Robert E. Platt II, Feasterville, Pa.
(R.D. 1, Riegelsville, Pa.)
Filed Jan. 23, 1961, Ser. No. 84,027
6 Claims. (Cl. 33—185)

This invention relates to devices for gauging the linear travel of a tool, carriage or other member which is movable in the performance of its work, such, for example, as in gauging the length of a cut of the tool of a lathe, planer, shaper or the like.

In modern manufacturing operations involving the employment of two relatively movable members the movement of which must be instantly stopped at a predetermined point in relation to the work being performed, it is difficult and frequently impossible with the mechanical gauging devices available to gauge the relative movement of the two operating members with the precision required. This often results not only in the complete spoilage of expensive material, but also in great loss of time of the operators.

Therefore, one of the principal objects of the present invention is to provide a vernier type linear gauging device in which the main scale and the auxiliary scale are attached to two relatively movable members. In a conventional lathe, for example, either of the vernier scales may be attached to the movable tool supporting carriage and the other scale to the stationary lathe bed. In other machines the movable member may support the work while the tool remains stationary. In such case one of the vernier scales may be attached to the movable work support and the other scale to a stationary part of the machine. In still other machines or apparatus both working members are movable toward or past each other. In such case each of the vernier scales may be attached to one of the movable members.

Another object of the invention is to provide in combination with the vernier attachment an electrical switch for attachment to one of the vernier scales and cooperative with the other scale in actuating a clutch or other mechanism for instantly stopping the relative linear movement of the two members, which in a lathe would mean stopping movement of the tool carriage. The switch support is attached to one of the relatively movable members and both the support and the switch element are provided with means for adjustment parallel with the vernier scales.

A further object of this invention is to provide, in co-operative relation with the electrical switch mentioned, a plurality of stop elements adjustably assembled in spaced relation on a bar mounted on one of the scales to stop the relative linear travel of the two relatively movable members at various predetermined points, as, for example, in turning a rod down to varying diameters in stepped relation. A particular advantage of this feature is that when the stops are assembled in properly spaced relation on the bar the assembly can be marked for identification of the work to which it applies, removed intact from the machine and filed for future use on work of the same kind.

Although the embodiment of my invention illustrated and described hereinafter is shown as applied to a conventional lathe it is believed to be obvious from the foregoing explanation that it is adaptable to the gauging of the relative movement of two relatively movable members in any other type of machine or apparatus in the direction of working travel, irrespective of whether one of the members is movable and the other stationary, or whether both members are movable. Moreover, although in the embodiment of my invention illustrated and described the main scale is shown as attached to the movable lathe carriage and the auxiliary scale attached to the stationary bed of the lathe, it is believed to be obvious that the relative positions of the two scales may be reversed, if desired; also that either of the two scales may be attached to either one of two members both of which are independently movable.

Further objects and advantages of my improved vernier gauging device will be apparent or pointed out in the following specification in which reference is had to the accompanying drawings forming a part thereof and in which FIG. 1 is a top plan view of one form of my improved vernier attachment, as applied to a lathe;

FIG. 2 is a side elevation of the attachment shown in FIG. 1;

FIG. 3 is a fragmentary top plan view as in FIG. 1, but with the addition of a conventional adjustor for the auxiliary scale;

FIG. 4 is an enlarged top plan view of the attachment as in FIG. 1, but with the addition of an electrical switch for limiting the travel of the lathe carriage and also including a pivoted stop finger;

FIG. 5 is a side elevation of the attachment as in FIG. 4;

FIG. 6 is a transverse section taken on the line 6—6 of FIG. 4;

FIG. 7 is a top plan view of the attachment as in FIG. 6, but with the addition of a plurality of stops cooperative with the electrical switch and the stop finger shown in FIGS. 4 and 5;

FIG. 8 is a side elevation of the attachment as in FIG. 7;

FIG. 9 is a transverse section taken on the line 9—9 of FIG. 7;

FIG. 10 is a transverse section taken on the line 10—10 of FIG. 7; and

FIG. 11 is a transverse section taken on the line 11—11 of FIG. 8.

Referring to the drawings in which like numerals designate like parts in the several views, and referring first to FIGS. 1, 2 and 3, as already mentioned, my improved vernier attachment is shown as applied to a conventional lathe, indicated by the numeral 10 and which includes an elongated extending bed 12 which in the form illustrated is T-shaped in cross-section on which is movably mounted an elongated carriage member 14 the longitudinal movement of which is effected by means of a feed screw 16, indicated in FIG. 1. This screw is operated through a conventional electrical clutch or other mechanism by a motor (neither of which is shown). A cutting tool 18 is mounted in the tool rest 20. As shown, a rod or bar 22, or other work piece, is chucked in the live center (not shown) of the lathe 10.

The vernier assembly includes a flat main scale 24 fixedly attached by screws 26 or other suitable means to a bracket 28 having at its free end a depending flange 30 for contact with a projecting portion of the carriage member 14, this flange being provided with a central vertical slot 32 (shown more clearly in FIG. 9) through which a headed screw 34 projects into the end of the carriage member for rigid attachment thereto of the main scale in parallel relation with the elongated stationary member 12.

The auxiliary scale 36 is also flat and of thicker construction than the main scale 24, and is provided with a longitudinal opening 38 (FIG. 11) through which the main scale projects in slidable relation with the auxiliary scale. The middle portion of the opening 38 is cut away to form transversely spaced beveled, and longitudinal, flanges 40 overlapping the edge portions of the main scale, and leaving the scale marks in view. The auxiliary scale is cut away longitudinally along its bottom rear edge portion to form a shouldered seat 42 (as also shown in FIG. 11) for engagement with the top front edge of the stationary member 12 to which it is adjustably clamped by means of a bottom plate 44 and a pair of headed screws 46. These screws project downwardly through the auxiliary scale 36 and the bottom plate 44 between the adjacent lateral edge portion of the T-shaped elongated stationary member 12 and the edge of the main scale 24 to clamp the scale and the bottom plate to the opposite sides of the lateral edge portion of the stationary member 12. A pair of leveling screws 48 in the plate 44 for engagement with the bottom surface of the auxiliary scale prevent forward tipping of the scale.

The attachment illustrated in FIG. 3 is the same as that just described with the addition of a conventional type of adjustor 50, by means of which a finer adjustment of the auxiliary scale among the main scale can be made than with free movement of the auxiliary scale. To use the adjustor it is necessary only to clamp it to the edge of the main scale 24 with the set screw 52 and then, with the clamping screws 46 loosened, rotate the nut 54 on the adjusting screw 56 secured to the end of the auxiliary scale 36.

The use of the vernier attachment illustrated in FIGS. 1 and 2 is very simple, consisting only of moving the carriage until the tool 18 is at the desired starting position in relation to the work piece 22, as illustrated in FIG. 1 and then, with the clamping screws 46 loosened, moving the auxiliary scale along the main scale and stationary member 12 until the zero marks on the two scales coincide. The screws 46 are then tightened, thus rigidly clamping the auxiliary scale to the stationary member 12. Thereafter the travel of the tool along the work piece will be precisely indicated on the two scales at any point.

The adjustor 50 may be employed to advantage, as already described, to correct a slightly erroneous starting position of the tool 18 or making extremely fine adjustments of the auxiliary scale 36.

In FIGS. 4, 5 and 6 is shown the addition of an electrical switch 58 mounted in or on a top plate or support 60 adjustably clamped to the stationary member 12, immediately beneath the main scale and between the bracket 28 and the auxiliary scale 36, by means of a bottom plate 62 and a clamping screw 64. This switch is connected in the electrical circuit with a clutch or other instrumentality (not shown) necessary to instantly stop the travel of the cutting tool 18. The switch is provided with a plunger 66 or other actuating element which operates the switch upon abutment or other contact with the near end of the auxiliary scale 36. The switch 58 is provided with means for adjusting it on the support 60 toward and from the end of the auxiliary scale 36. Such means in the form illustrated consists of a threaded shank 68 attached to the switch and clamped by nuts 70 in one of the wall portions of the support 60 forming a recess 72 within which the switch 58 is mounted and which recess is of sufficient width to permit movement of the switch toward and from the auxiliary scale. The support 60 is cut away at its rear edge to form a shouldered seat 74 for engagement with the front edge of the stationary member 12. It is also provided with a leveling screw 76 to prevent forward tipping of the support 60. A finger 77 is pivotally attached to the end of the auxiliary scale for a function to be later described.

Since the electrical switch 58 and electrical clutch or other mechanisms actuated by it for controlling the linear movement of the tool and carriage member 14 are of conventional designs available on the market, and since the present invention involves only the means of actuation of the switch, no diagram of the electrical connections to the elements for operating the clutch or other control mechanisms is shown.

In the use of the electrical switch referred to the steps are the same as those described in connection with FIGS. 1 and 2 up to the coincidence of the zero marks on the two scales. At this stage the two scales are locked together by a set screw 78 mounted in the front portion of the auxiliary scale for engagement with the edge of the main scale. The switch support 60, with clamping screw 64 loosened, is then moved to bring the switch 58 into contact with the end of the auxiliary scale and then locked to the stationary member 12 by the clamping screw 64. With the adjusting screws 46 still loosened the set screw 78 is next loosened and the auxiliary scale moved away from the switch 58 along the main scale to the point of measurement marking the length of travel of the tool desired. The set screw 78 is now tightened thereby locking the two scales together.

After the lathe is started into operation the carriage will pull the main scale 24 and the attached auxiliary scale along the stationary member 12 until the end of the auxiliary scale contacts and actuates the switch 58, having then moved through the predetermined length of travel.

The attachment illustrated in FIGS. 7 and 8 is the same as that shown in FIGS. 4, 5 and 6 except with the addition of an assembly of adjustable stops in cooperation with the auxiliary scale 36 and the electrical switch 58 for work requiring that the tool be accurately positioned at various points in linear relation to the work. This assembly includes a rod or bar support 80 adjustably mounted on the main scale 24 outwardly from the auxiliary scale by means of a set screw 82, and a bar 84 removably mounted in the support in parallel relation with the two scales by means of a set screw 86. Several stop collars 88, identified in FIG. 8 by numerals 1, 2, 3, 4 and 5, are adjustably mounted on the bar 84 inwardly from the support 80 by means of set screws 90.

In the use of the stop collars 88 the steps are the same as those described in connection with FIGS. 4, 5 and 6 up to the positioning of the electrical switch 58 against the end of the auxiliary scale 36. Then, assuming that the various desired lengths of travel of the tool have been determined, as, for example, in connection with the operation of turning the bar 22 down to a number of diameters in stepped relation, and assuming that all the collars are between the auxiliary scale and the rod or bar support 80, and also assuming that the bar 84 is locked to the support 80 by set screw 86 and that the support 80 is locked to the main scale at a point sufficiently distant from the auxiliary scale 36 to accommodate the maximum total length of tool travel needed, the next step is to lock the collars 88 to be used on the bar 84 in correctly spaced relation by means of the set screws 90. This is done by first loosening the set screw 78 and moving the auxiliary scale 36 toward the bar support 80 to the point on the main scale marking the predetermined end of the length of the first diameter. The auxiliary scale is then locked to the main scale by set screws 78, after which the finger 77 is raised against the bar 84 and the nearest collar 88 (No. 1) moved into contact with it. This collar is then locked on the bar 84 by its set screw 90, and the finger 77 lowered. The auxiliary scale 36 is then unlocked from the main scale 24 and moved to the end of the next predetermined length on the main scale and locked thereto. The finger 77 is again raised and the next collar 88 (No. 2) moved against it and locked on the bar 84. As many collars as needed may be set up on the bar 84 in the same manner previous to the start of any machining operation on the bar 22, or other work piece.

After the necessary number of collars 88 has been set up on and locked to the bar 84, and with the bar still locked in the holder 80 by the set screw 86 and the holder still locked to the main scale 24 by the set screw 82, also with the finger 77 in raised position, and the two scales unlocked, also before the machining operations are started, the auxiliary scale is moved along the main scale until the face 79 of finger 77 contacts the face 89 of the first collar 88 (No. 1). The auxiliary scale is then locked to the main scale by the set screw 78. The first machining operation is then started.

When the carriage 14 moves in the machining of the first length of the cut the end of the auxiliary scale 36 will be moved into contact with and actuate the switch 58 to stop the movement of the carriage member 14 and tool after they have moved the predetermined distance. The second and all succeeding lengths on the work piece are then machined by first loosening set screw 78 to unlock the auxiliary scale 36 from the main scale 24, then lowering finger 77 to clear the collar (No. 1) just used, then moving the auxiliary scale to its approximate next position, then raising the finger 77 and moving the auxiliary scale until the face 79 of finger 77 contacts the face 89 of the next collar to be used, in the same manner as with the first one. The set screw 78 is then again tightened to lock the auxiliary scale 36 to the main scale 24.

As illustrated in FIGS. 7 and 8, the first and second collars 88 (No. 1 and No. 2) have been set up in properly spaced relation on the bar 84 for machining two lengths on the work piece 22 in the manner described, the auxiliary scale being moved one length farther away from the switch 58 as each collar is adjusted into its predetermined position. Therefore, it will be seen that before the machining operation on the first length of the work piece begins the auxiliary scale must be moved back toward the switch 58 until the face 89 of collar No. 1 contacts the face 79 of finger 77 and then locked to the main scale, as described. Then, after the first length of the machining operations has been completed the auxiliary scale is unlocked and moved toward the switch 58 until the face 79 of the finger 77 contacts the face 89 of collar No. 2, after which the machining operation on the second length of the work piece is performed. The subsequent operations are performed in a like manner.

As previously mentioned, one important advantage of the above described feature is that the bar 84 with all the collars 88 assembled thereon in correctly spaced relation for gauging a particular series of lengths can be marked for identification as applicable to such operation and filed to be used later in a repetition of the operation, thereby saving a substantial amount of time in the setting up of the machine. Moreover, the bars 84 and the collars 88 are so simple and inexpensive to make as to render it economical to maintain a large number of such assemblies for future use.

From the foregoing description it will be seen that I have provided a simple and efficient device for precise gauging of the relative linear movement of any two relatively movable members, either or both of which may be movable in relation to the other. It will also be seen that either of the vernier scales may be attached to either of the relatively movable members whether they belong to a lathe, as illustrated, or to any other machine or apparatus.

Obviously, various changes or modifications may be made in my improved vernier gauging device without departing from the spirit or scope of my invention. Therefore, it should be understood that the embodiments of my invention shown and described are intended to be illustrative, only, and restricted only by the appended claims.

I claim:

1. In combination with a machine having an elongated stationary member and an elongated movable member mounted thereon, said stationary member having lead screw means engaging the movable member for moving it in longitudinal relation with said stationary member, a vernier gauging device for gauging the length of movement of said movable member, said device comprising an elongated main scale and a rectangular auxiliary scale in longitudinally slidable relation therewith, one of said scales having means for fixedly attaching it to one of said machine members and the other scale having set-screw means for adjustably clamping it to the other machine member in parallel relation with the other scale and the other machine member; said scales having set-screw means for clamping them together, an electrical control switch having set-screw means for rigidly but adjustably clamping it to one of the machine members in overlapping relation with one of the scales, said switch also having means for actuating it upon contact with the other scale when the two scales are in rigidly clamped relation.

2. A vernier gauging device as in claim 1 and including means for successively gauging a series of parallel lengths of movement of said movable machine member, comprising a bar having means for adjustably and removably clamping it to one of the scales, a plurality of stop collars adjustably mounted on said bar in spaced relation corresponding to predetermined lengths of movement of a vertically movable finger transversely mounted on the other scale for abutment with either of said collars when said finger is in its raised position.

3. In combination with a machine having an elongated stationary base member and an elongated carriage member mounted thereon in longitudinally movable relation therewith, said machine also having lead screw means connected with said carriage member for effecting movement thereof longitudinally of said base member, a vernier gauging device for gauging the length of movement of said carriage member relative to said base member, said device including an elongated main scale and a rectangular auxiliary scale mounted for freely slidable movement thereon, one of said scales having means for fixedly attaching it to one of said machine members, and the other scale having set-screw means for clamping it to the other machine member in rigid, but longitudinally adjustable relation therewith, the relative slidable movement of said scales being effected solely by and corresponding in length to the movement of said carrier member to which one of said scales is attached; and including set-screw means for locking the two scales together and also including an electrical control switch having set-screw means for rigidly, but adjustably, clamping it to the stationary machine member in overlapping relation with the main scale between the attached end thereof and said auxiliary scale, said switch having means for actuating it upon contact with the auxiliary scale when the two scales are in locked relation.

4. A vernier gauging device as in claim 3 and including means for successively gauging a series of parallel lengths of movement of the movable carriage member, said means comprising a support having set-screw means for rigidly, but adjustably, clamping it to the main scale, a bar mounted on said support in parallel relation with and above said main and auxiliary scales, a plurality of stop members slidably mounted on said bar and having set-screw means for locking them on said bar in spaced relation corresponding to predetermined lengths of movement of the carriage member, and a vertically adjustable finger transversely mounted on the auxiliary scale for abutment with either of said stop members when said finger is in its raised position.

5. A vernier gauging device as in claim 3 in which the bar support is provided with set-screw means for removably mounting said bar on said support.

6. In a combination with a machine including an elongated stationary base member having a flat laterally projecting top edge portion, and an elongated carriage member mounted thereon in longitudinally movable relation therewith, said machine also having means connected with said carriage member for effecting movement thereof longitudinally of said base member, and a vernier gauging device for gauging the length of movement of said carriage member relative to said base member, said device also including an elongated main scale and a rectangular auxiliary scale mounted for freely slidable movement thereon, said main scale having screwthreaded means at one end for fixedly attaching it to said carriage member, and said auxiliary scale having a bottom plate and a pair of clamping screws projecting downwardly through said auxiliary scale and bottom plate between the adjacent edges of said elongated stationary member and main scale for clamping the laterally projecting edge portion of said elongated stationary member between said auxiliary scale and bottom plate for fixedly, but adjustably attaching said auxiliary scale to the laterally projecting edge of said elongated stationary member.

References Cited in the file of this patent

UNITED STATES PATENTS

| | | |
|---|---|---|
| 2,018,363 | Hoelscher | Oct. 22, 1935 |
| 2,276,302 | Guttman | Mar. 17, 1942 |
| 2,704,890 | Welsch | Mar. 29, 1955 |

FOREIGN PATENTS

| | | |
|---|---|---|
| 118,593 | Great Britain | Apr. 10, 1919 |